Dec. 22, 1931.  M. M. QUEINNEC  1,837,996
APPARATUS FOR THE MOLDING OF PANELS AND THE LIKE
Filed Sept. 5, 1929
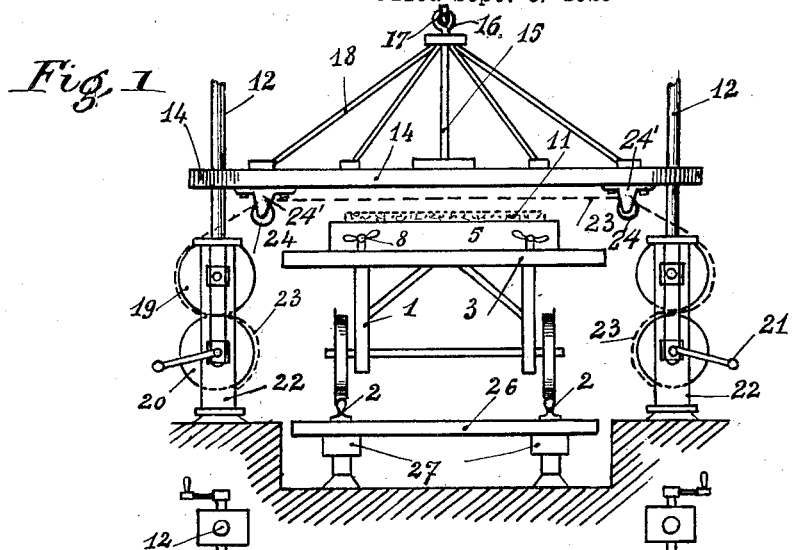
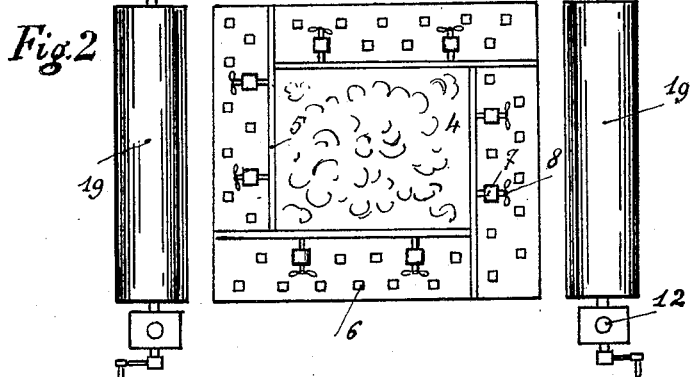
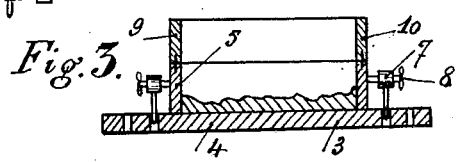
INVENTOR
Marguerite M. Queinnec
By William C. Linton
Attorney.

Patented Dec. 22, 1931

1,837,996

UNITED STATES PATENT OFFICE

MARGUERITE MARIE QUEINNEC, OF LANDIVISIAU, FRANCE

APPARATUS FOR THE MOLDING OF PANELS AND THE LIKE

Application filed September 5, 1929, Serial No. 390,562, and in France September 6, 1928.

The present invention relates to an apparatus for use with a known molding process for the manufacture of facing panels, architectural ornaments and analogous articles, starting from a very liquid mixture consisting of cement and fibrous material, or the like.

The known material and molding processes are defective due to the fact that they require considerable labor and often produce imperfect results.

The apparatus according to the invention can be very readily employed, and provides for the rapid and uniform manufacture of articles while affording a great saving of labor.

The following description with reference to the accompanying diagrammatic drawings shows by way of example an embodiment of the said invention and its practical operation.

Fig. 1 is an elevational view of the apparatus according to the invention.

Fig. 2 is a plan view of the apparatus with its upper plate and absorbing felt removed.

Fig. 3 is a cross section of the mold and of its forms or frame, upon which is disposed a supplementary frame.

Fig. 4 is a bottom plan view of the upper plate of the apparatus.

The apparatus comprises a carriage 1 travelling preferably on rails 2 and carrying a platform 3 adapted to support the mold 4 which is disposed between the wood or metal frame 5. To secure and regulate the said frame consisting of adjustable elements with reference to the mold according to its size and shape, the table 3 is provided with several rows of rectangular holes 6 adapted for the insertion of the nut square rods 7 into which are screwed the threaded bolts 8 in order to press the frame elements 5 against the mold 4. The said frame is preferably lined with a band of india rubber or of a greased felt, not, shown, in order to make the frame leakless.

Before the mold carriage is disposed in the apparatus which will be further described, a second frame 9 is disposed above the frame 5 and is secured thereto by studs 10 in such manner that it may be readily removed.

The cement product or paste is prepared according to the known methods and may be composed of Portland cement and asbestos; it is poured in a very liquid state into the mold frames 5—9. To allow the dense parts of the said paste to properly settle in a fine layer upon the surface of the mold 4, a stream of compressed air at low pressure is passed over the whole surface of the mold in such manner as to expel all air bubbles which would form holes in the cast article.

The said paste is then entirely covered with spongy felt and is then subjected to a drying operation by the slow withdrawal of the water from a point above the said felt by the use of a pump. When the excess of water has thus been removed by the absorption of the felt and the said suction, the paste in the mold now loses its fluidity and has the consistency of a paste, its level is thus lowered, and the upper frame 9 is removed.

The said carriage supporting the mold 4 and its frame 5 and covered by a permeable felt or textile fabric 11 which rises above the level of the frame, is introduced into the apparatus which will be further described and in which the said paste is completely dried.

Referring to Figures 1, 2 and 4, the said apparatus comprises four guiding uprights 12 which are inserted through holes 13 in the four corners of a plate 14 which is suspended at its centre by a rod 15 having at the top a hook 16 to which is attached the end of a cable 17 passing over pulleys secured to the ceiling of the room, whereby said cable will serve to raise and lower the said plate. Suitable rods 18 aid in supporting the plate. The cable is operated by known means, not shown.

On the respective sides of said carriage and between each pair of uprights 12 are disposed a pair of cylinders or rollers 19—20; the lower cylinder 20 may be rotated by a crank 21, or otherwise by mechanical means.

The shafts of said cylinders, operating in bearings, are guided in the uprights 22 which support the guiding rods 12. The upper cylinders 19 rest by their own weight upon the lower cylinders 20 and are thus rotated by friction. An absorbing felt member 23 extends horizontally above the mold 4, and its form or framing, and its end are engaged between the respective pairs of cylinders 19—20; hence by rotating one of the lower cylinders in alternate directions, the felt is given a reciprocating motion while at the same time the device expels the water it absorbed when travelling above the mold, at which time it was brought upon the same by the descent of the plate 14.

The felt must not move in contact with the mold after the plate 14 has been raised and the felt travels horizontally in order to squeeze out the same and to wind it upon the cylinders, and for this reason the felt is caused to travel upon a pair of rollers 24 mounted on said plate by means of brackets 24' or the like; thus when the plate is raised the felt will rise with it, and when moving horizontally it cannot rub upon the surface of the paste, nor displace the latter.

For the discharge of the water pressed out the felt 11 covering the paste in the mold, by means of the plate 14, the said plate carries a set of fine grooves 25 on its under side, as shown in Figure 4. The said grooves must not make contact at all times with the paste in the same place, and to prevent this, the carriage is slightly moved on the track.

A set of jacks 27 is mounted below the platform 26 of the track, and will raise the carriage as the substance dries, and this also effects a closer adhesion between the felt members 23 and 11 and the cement paste when the latter becomes hardened, also preventing all prejudicial compression when the drying commences by lowering the carriage.

Such jacks are of the known construction and operation for the raising of relatively light loads, and need no special description with reference to a drawing.

The said apparatus for the drying of the substance in the mold can be used until the molding operation is finished, only in the case of molds having a low relief and a relatively flat surface. However the molds having a high relief may be almost entirely finished below the same drying device, and in this case the said flat plate as 14 is replaced by a plate serving as a second matrix plate and suitably grooved or striated, in which event the carriage remains in the fixed position below the plate, or otherwise, the following process may be employed.

Since the flat plate crushes the paste in an irregular manner and drives it towards the sunken parts, the higher parts of the mold will thus be cut-down. The carriage moves from under the dryer before the substance has been completely dried; the cut-down parts to be now raised are covered with a preliminarily dried paste which is fed through the rectangular orifice of a small apparatus consisting simply of a flexible bag from which the paste is expelled by compression and is molded at its discharge through said orifice. In this manner the reinforcing substance will no longer proceed below the drying device.

The description and accompanying drawings show an embodiment of the said invention and its operation, but it is obvious that all parts of the same may be replaced by other parts having like functions, without departing from the spirit of the invention.

Having now described my said invention and how it is to be performed, I declare that what I claim is:

1. An apparatus for drying the cement paste contained in the mold form for the production of panels and analogous articles, which comprises, a mold with its frame disposed upon the table of a carriage, a plate disposed above the said table of the carriage and provided with means for raising and lowering it, said plate being combined with uprights whereby it is guided, said uprights having between them and on the respective sides of the carriage a pair of rollers, the lower roller of each pair being adapted to be rotated and to thus drive its upper cooperating roller by friction, and to actuate and to dry a felt band extending horizontally above the mold mounted on the said carriage, the ends of said felt band being engaged respectively between each pair of rollers.

2. An apparatus as claimed in claim 1, wherein the plate has its lower surface striated for the discharge of the water expelled from the felt band.

3. An apparatus as claimed in claim 1, wherein the plate is mounted for up and down movement and is provided at the respective ends with a roller adapted to guide the felt band and to raise it together with the plate.

4. In the apparatus claimed in claim 1, a support for the carriage consisting of a platform mounted upon jacks whereby the said carriage may be raised and lowered.

5. In the apparatus claimed in claim 1, the installation of a mold and its frame upon the table of the carriage comprising the mold, adjustable elements of the frame surrounding the mold, holes in the platform of the carriage for the insertion of the rods of the nuts, threaded rods screwed into the nuts in order to press the elements of the frame against the lateral faces of the mold.

6. In the apparatus claimed in claim 1 a second frame removably mounted on the first by means of studs.

MARGUERITE MARIE QUEINNEC.